United States Patent [19]
Monroe et al.

[11] Patent Number: 5,293,388
[45] Date of Patent: Mar. 8, 1994

[54] COMPRESSION/DECOMPRESS WITH ECC DATA FLOW ARCHITECTURE

[75] Inventors: Kerry Jon Monroe, Fort Collins; Kurt Evan Godwin, Loveland, both of Colo.

[73] Assignee: Hewlett-Packard Company, Palo Alto, Calif.

[21] Appl. No.: 612,566

[22] Filed: Nov. 13, 1990

[51] Int. Cl.$^5$ .............................................. G06F 11/10
[52] U.S. Cl. .................................. 371/37.1; 364/401; 395/575
[58] Field of Search ....................... 371/37.1; 364/401; 395/575

[56] References Cited
U.S. PATENT DOCUMENTS

5,128,859  7/1992  Carbone et al. ..................... 364/401

Primary Examiner—Hoa T. Nguyen

[57] ABSTRACT

An architecture for providing hardware compression/decompression with ECC to data flow in a computer system utilizes a hardware implementation of the compression/decompression circuit in a peripheral adapter of one of many peripheral devices. Error correction coding is provided by software in the host RAM. The compression/decompression circuit can be located in the periphery and can service a number of peripheral devices. The CPU and DMA controller in the host computer are capable of providing concurrent processing for hard disk operation, peripheral control (such as a tape or a modem), compression/decompression of data, and error correction coding of the compressed data. This significantly speeds up the performance of the computer system.

7 Claims, 3 Drawing Sheets

COMPRESSION/DECOMPRESS WITH ECC DATA FLOW ARCHITECTURE

BACKGROUND OF THE INVENTION

1. Field of the Invention

The present invention relates to the compression and decompression of data and, more particularly, to the compression and decompression of data in combination with error correction coding (ECC) in a computer peripheral environment.

2. Statement of the Problem

Two basic architectural approaches to the compression/decompression (CD) of data involving ECC are conventionally available.

Figure 1:
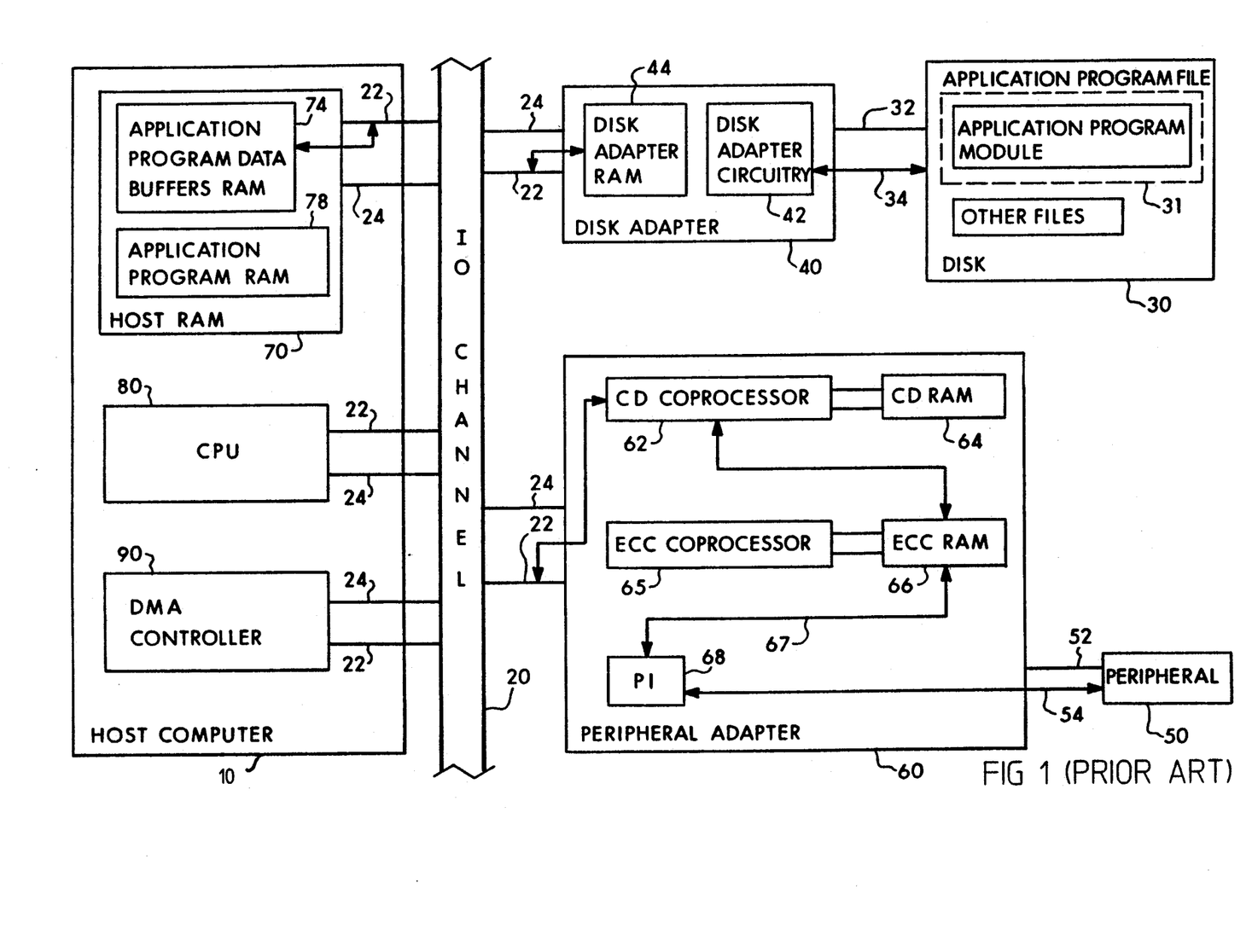
FIG. 1 is a prior art architecture showing the use of hardware ECC and compression/decompression both located external of the host computer in the periphery.

In FIG. 1, a first prior art computer configuration is shown. A host computer 10 is interconnected with the conventional input/output (I/O) channel 20. Also connected is a disk 30 which is interconnected through a disk adapter 40 to the I/O channel 20. A peripheral device 50 connected through a peripheral adapter 60 also accesses the I/O channel 20. Internal to the host computer 10 is a host RAM 70 which contains the application program data buffers 74 and the application program 78. The host RAM 70 is connected to the I/O channel 20 over an I/O data bus 22 and an I/O control bus 24. Host computer 10 also contains CPU circuitry 80 which is connected to the I/O channel over the data bus 22 and the control bus 24. Finally, the host computer contains a direct memory access (DMA) controller 90 which also accesses the I/O control bus 24 and an I/O data bus 22. In this prior art approach, the disk 30 could, for example, correspond to the hard disk internal to the computer 10. The hard disk 30 has an application program file 31 and other files. The disk 30 delivers control signals over bus 32 and data signals over bus 34 to the disk adapter 40. The disk adapter 40 has disk adapter circuitry 42 and a disk adapter RAM 44 for providing the communications between the host computer 10 and the disk 30. This is a conventional architecture and the transfer of data between the host computer 10 and the disk 30 occurs in an uncompressed format without error correction.

The peripheral 50 could be any suitable peripheral such as, for example, a tape backup or another disk. The peripheral 50 communicates with its peripheral adapter 60 over a control bus 52 and a data bus 54. In the peripheral adapter 60 is a compression/decompression (CD) co-processor 62 which communicates over a control and data bus with a compressor/decompression RAM 64. The CD co-processor 62 also communicates over a bus with ECC RAM 66 which is under the control of an ECC co-processor 65. The ECC co-processor 65 communicates with the ECC RAM 64 over control and data buses. Finally, the ECC RAM 64 delivers compressed ECC data over bus 67 to a peripheral interface (PI) 68 which delivers the compressed ECC data over the data bus 54 to the peripheral device 50. In this prior art approach, the peripheral adapter 60 utilizes separate co-processors 62 and 65 with associated RAM 64 and 66 to accomplish the compression/decompression and error correction coding activities. This is an expensive approach to compression/decompression and ECC since for each peripheral device 50, different co-processors 62 and 65 would have to be utilized. Even for one peripheral device 50, the expense is undesirable.

In FIG. 1, the following data flow occurs. The host computer 10 delivers data from the application program data buffers RAM 74 over the I/O data bus 22 and into the peripheral adapter 60. This is delivered into the CD co-processor 62. The algorithm for performing compression and decompression is found in the CD co-processor 62 and RAM 64 and is used by the co-processor in the compression/decompression process. The second transfer occurs from the CD co-processor 62 to the ECC RAM 66 wherein the ECC co-processor 65 provides error correction coding to the data in the RAM 66. The third transfer is from the ECC RAM 66 to the peripheral interface 68. The third transfer transfers the compressed ECC data. Finally, the fourth transfer delivers the compressed ECC data from the peripheral interface 68 over the data bus 54 to the peripheral device 50. Of course, decompression occurs opposite to the above transfer and data flow.

In the prior art approach of FIG. 1, the disk 30 contains the application program module 31 which is loaded into the host RAM 70 by the host computer 10. The CPU 80 and/or the DMA controller 90 controls the first data transfer from the host RAM 70 to the peripheral adapter 60. It is to be expressly understood that in some embodiments, the CD co-processor 62, CD RAM 64, ECC co-processor 65, and ECC RAM 66, could be moved to the peripheral device 50.

Figure 2:
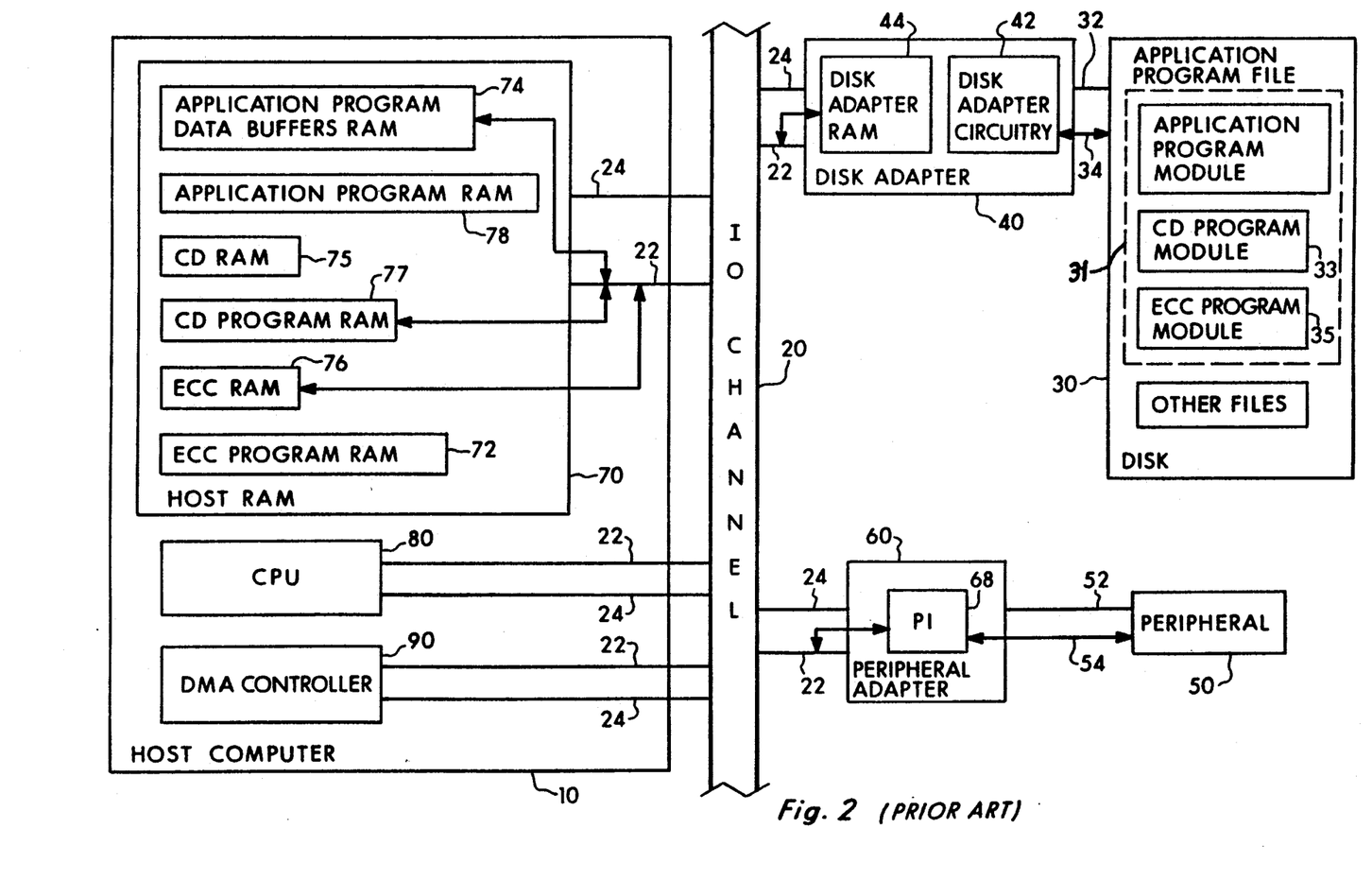
FIG. 2 is a prior art architecture showing the use of software ECC and compression/decompression both located internally in the RAM of the host computer.

In FIG. 2, a conventional approach is shown wherein both compression/decompression and ECC are performed in software.

In FIG. 2, similar numerical references of FIG. 1 are used to identify similar components. However, in this environment, the host RAM 70 also includes compression/decompression RAM 75, compression/decompression program RAM 77, ECC RAM 76, and ECC program RAM 72. This is all software which is loaded internally to the host RAM 70 from disk 30 where the CD program module 33 and ECC program module 35 reside along with the application program module in the application's program file 31. Hence, when it is desired to deliver compressed ECC data to the peripheral device 50, the application program file in disk 30 is conventionally loaded into the appropriate section 74 of RAM 70 (as shown in FIG. 2). The transfer of data occurs in the following sequence. The first transfer involves the delivery of data from the application program data buffers RAM 74 over the data bus 22 in the I/O channel and into the CD program RAM 77 where it is compressed by the CD algorithm. After compression, the second transfer is the transfer of the data from the CD program RAM 77 onto the I/O data bus 22 for delivery into the ECC RAM 76 where error correction coding occurs under direction of the algorithm in the ECC program RAM 72. The third transfer is from the ECC RAM 76 over the I/O data bus 22 to the peripheral adapter 60. This transfer is a transfer of compressed ECC data. The first two transfers are conventionally under control of the CPU 80. The third transfer is conventionally under control of either the CPU 80 or the DMA controller 90. The peripheral interface 68 then communicates the compressed ECC data to the peripheral device 50. Again, decompression occurs in the reverse sequence.

FIG. 1 represents a prior art approach wherein both compression/decompression and ECC occur in hardware external electrically to the host computer 10. As mentioned, the requirement for separate hardware in each peripheral adapter (or peripheral) became expensive. The prior art approach of FIG. 2 reduces the expense by placing both the compression/decompression and ECC activities as software internally in the host RAM of the host computer. The software modules are located in the disk 30. Hence, upon calling up the application program file 31, the CD and ECC modules are downloaded from the disk 30 into the host RAM 70. While the prior art approach of FIG. 2 achieved the goal of reducing the hardware expense associated with the approach of FIG. 1, it did not provide an optimum solution. The compression/decompression software program degraded overall data transfer speed to an unacceptable level. For example, when the host computer is a 286 chip operating at 8 MHz to compress 40.5 mega-bytes of data to a 1 megabit/sec tape drive, the software compression approach of FIG. 2 takes approximately 20-25 minutes whereas the hardware compression circuit of FIG. 1 takes approximately 7-9 minutes. The CPU 80 was required to implement the compression/decompression process and, therefore, a substantial time penalty occurred. In applications where time was not a factor, the prior art approach of FIG. 2 fully satisfied the cost reduction need of FIG. 1.

A need exists for performing compression/decompression and ECC in an architectural arrangement that not only reduces the expense of FIG. 1 (i.e., external CD and ECC hardware), but also reduces the time problems associated with doing compression/decompression in the prior art approach of FIG. 2 (i.e., CD and ECC performed by internal software). An optimum architectural arrangement would reduce the cost associated with FIG. 1 and substantially speed up the compression/decompression activity of FIG. 2.

3. Results of Patentability Search

A patentability search was directed towards the solution of the above stated problem. The results of that search are set forth below.

| INVENTOR | PATENT NO. | ISSUE DATE |
|---|---|---|
| Iida | 4,408,301 | 10-4-83 |
| Reitsma | 4,622,585 | 11-11-86 |
| Cotton et al | 4,688,108 | 8-18-87 |
| Hamilton et al. | 4,897,717 | 1-30-90 |
| Janku | 4,902,881 | 2-20-90 |
| O'Brien et al. | 4,929,946 | 5-29-90 |
| Hamilton et al. | 4,951,139 | 8-21-90 |

U.S. Pat. No. 4,408,301 sets forth a picture information filing system wherein data from a character pattern generator and picture scanning device is compressed onto a magnetic tape. The data from the magnetic tape is then decompressed for a picture display or a picture element memory.

U.S. Pat. No. 4,622,585 sets forth a compression/decompression system for transmitting and receiving compressed picture information that is arranged in rows and columns of pixels. The data which is scanned in is compressed and may be selectively stored in an optical disk, magnetic disk, or RAM. The compressed data from storage is then delivered through a decompressor into a CRT or printer.

U.S. Pat. No. 4,688,108 pertains to a high resolution graphic system for a video/teleconferencing system. Again, data from a scanner is compressed and delivered into memory. The compressed data from memory is delivered through a decompressor for display.

U.S. Pat. No. 4,897,717 sets forth a computer base video compression system which utilizes a subsystem in the host computer to compress video images. The '717 patent utilizes a special circuit in its compression system. A frame grabber is used to input and output analog information from a memory internal to the frame grabber. That memory is connected to a second memory in the special circuit which enables a fast transfer of data from one memory to the other memory. The memory in the special circuit then provides the information to a compression unit which delivers compressed data to the host memory. Likewise, the compressed data in the host memory can be transferred back into memory in the special circuit which accesses a decompression unit for delivery of decompressed data to the frame grabber. The '717 approach utilizes fast transfer rates. U.S. Pat. No. 4,951,139 is related to the '717 patent.

U.S. Pat. No. 4,902,881 relates to a parallel process communication terminal network wherein a high speed co-processor is used to implement a data compression/decompression algorithm.

U.S. Pat. No. 4,929,946 pertains to an adaptive data compression apparatus including run length and coding for a tape drive system. This corresponds to the prior art approach of FIG. 1 wherein data compression and decompression occurs on the peripheral adapter between the peripheral device and the host.

None of the above patented approaches solve the specific problem set forth above of providing an optimal design configuration involving use of error correction coding and wherein the expense of the FIG. 1 prior art approach is reduced and the time to perform compression/decompression is reduced

SUMMARY OF THE INVENTION

An architecture for providing hardware compression/decompression with software ECC for data flow in a computer system utilizes a hardware implementation of the compression/decompression circuit in a peripheral adapter of one of the many peripheral devices. Error correction coding is provided by software in the host RAM. The compression/decompression circuit can be located in the periphery and can service a number of peripheral devices. The CPU and DMA controller in the host computer are capable of providing concurrent processing for hard disk operation, peripheral control (such as a tape or a modem), compression/decompression of data, and error correction coding of the compressed data. This significantly speeds up the performance of the computer system.

DETAILED DESCRIPTION

Figure 3:
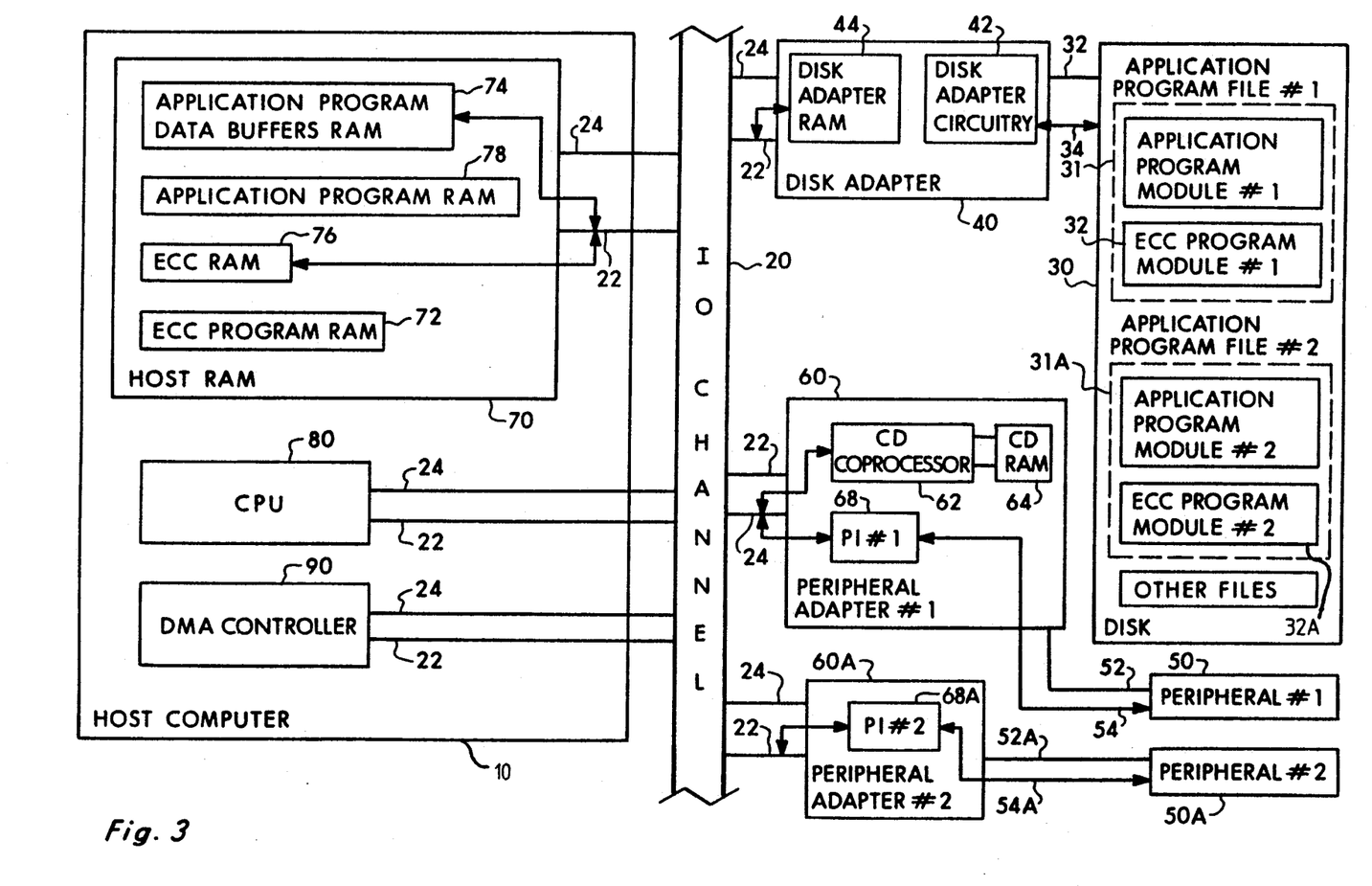
FIG. 3 is the architecture of the present invention showing the use of hardware compression/decompression located external of the host computer in the periphery and software ECC located internally in the RAM of the host computer.

The compression/decompression and ECC architecture of the present invention is set forth in FIG. 3. Again, where like components correspond to like components in FIGS. 1 and 2, the same reference numerals are utilized.

In FIG. 3, it can be readily observed that the CD co-processor 62 and its corresponding CD RAM 64 are located externally from the host computer 10 in the peripheral adapter 60. However, the ECC is performed in software internal to the host RAM 70. Hence, the present invention reduces the hardware cost of FIG. 1 by approximately fifty percent by maintaining the CD co-processor and RAM 62 and 64 hardware on the peripheral adapter 60 thereby preserving significant compression/decompression speed while reducing the physical costs by placing the ECC as software in the host RAM 70. Under the teachings of the present invention, the CD activity occurs external of the host computer and is located in the periphery whereas the ECC activity occurs internally in the host computer 10. More importantly, only one CD processor and CD RAM is utilized under the teachings of the present invention. One hardware implementation will service all of the peripheral devices even though the CD processor and CD RAM are located on one peripheral adapter card. This significantly reduces expense since individual CD processors and CD RAMs are not required on individual peripheral adapters.

In operation, the application program file 31 corresponding to peripheral device 50 is loaded into the host RAM 70. This includes loading the ECC program module 32 into the host RAM as the ECC RAM 76 and ECC program RAM 72. The host computer 10 can now generally operate as follows. First, data for a selected peripheral device is delivered from the application program data buffers in the host RAM over the data bus 22 of the I/O channel 20 and into the CD compressor 62 of the peripheral adapter 60. Compression then occurs. The compressed data is delivered on the I/O data bus 22 over the I/O channel 20 to the ECC RAM 76 in the host RAM 70. Error correcting coding then occurs on the compressed data. Third, the compressed ECC data is delivered on the I/O data bus 22 to the selected peripheral interface 68. Finally, the peripheral interface 68 transfers the compressed ECC data to the selected peripheral device 50. Decompression occurs generally in a reverse of the above sequence of transfers. A detailed description of the data flow is set forth below.

Under teachings of the present invention, and as shown in FIG. 3, the compression/decompression co-processor 62 and the associated RAM 64 can be located in any one of the peripheral adapters 60. Only one is required to service all of the different peripheral devices and to provide compression/decompression abilities to the host computer. In the preferred embodiment, the CD circuit is placed on an expansion card for insertion into an available slot in a personal computer. Furthermore, as will be more fully explained subsequently, the DMA controller 90 and the CPU 80 can be programmed to process activities concurrently involving ECC and compression/decompression as well as communicating with the disk and with the peripherals.

1. Compression Flow of Data

The following processing steps occur in the compression of data:

1. In the configuration of FIG. 3, a number of peripheral devices 50 could be interconnected to the I/O channel 20. In FIG. 3, two are shown, 50 and 50a. Corresponding to each peripheral device 50 is an application program file 31 in disk 30. Application program file number one 31 corresponds to peripheral device number one which is designated 50. Application program file number two 31a corresponds to peripheral device number two which is labeled 50a. Hence, when the host computer 10 desires to communicate with the peripheral device 50a, the application program file 31a (corresponding to device 50a) is loaded into the host RAM 70 in a conventional fashion through the disk adapter 40 and over the I/O channel 20. The host computer 10 creates in the host RAM 70 an ECC Program Section 72 and the ECC program from the ECC program module number two 32a is loaded into this created section 72.

2. The host computer 10 then creates the application program data buffers section 74 and the ECC data buffer section 76.

3. The disk adapter 40 transfers data resident in the disk 30 to the disk adapter RAM 44.

4. The CPU 80 or the DMA controller 90 transfers data from the disk adapter RAM 44 over the I/O channel 20 into the application program data buffers 74.

5. The CPU 80 or the DMA controller 90 then transfers data from the application program data buffers 74 to the CD co-processor 62 in the peripheral adapter 60 over the I/O channel 20.

6. The CD co-processor 62 based upon its compression/decompression algorithms then compresses the data in the CD RAM 64. It is important to note that the present invention is independent of the specific compression/decompression algorithms that are utilized.

7. The CPU 80 or the DMA controller 90 then transfers the compressed data from the peripheral adapter 60 to the ECC data buffer section 76 over the I/O channel 20. The ECC program 72 generates the error information for the compressed data in ECC RAM 76. It is to be expressly understood that any ECC algorithm or technique could be utilized under the teachings of the present invention.

8. The CPU 80 or the DMA controller 90 then transfers the data from the ECC data buffers 76 to the peripheral interface 68a in the peripheral adapter 60a of the selected peripheral device 50a over the I/O channel 20. Peripheral interface 68a then transfers the compressed ECC data to the selected peripheral device 50a according to the convention for the peripheral device 50a (such as serial or parallel transfer).

The above data flow illustrates the case for using the CD processor 62 located on peripheral adapter #1 for compressing data for subsequent delivery to peripheral adapter #2.

While the above sequence represents the preferred order of processing, it is to be expressly understood that variations thereof could be made thereto under the teachings of the present invention.

2. Decompression Flow of Data

With reference to FIG. 3, the decompression flow of data will now be described:

Steps 1 through 3 set forth above for the compression flow of data are repeated.

4. The peripheral adapter 60a transfers the data over the data bus 54a from the selected peripheral device 50a through the peripheral interface 68a.

5. Either the CPU 80 or the DMA controller 90 transfers the data from the peripheral adapter 60a to the ECC data buffer section 76 in the host RAM 70 over the I/O channel 20.

6. The ECC program 72 generates the necessary syndrome information and corrects the transferred data.

7. Either the CPU 80 or the DMA controller 90 transfers the corrected data from the ECC data buffer 76 to the CD co-processor 62 in the peripheral adapter 60 over the I/O channel 20. The CD co-processor 62 based upon the algorithms decompresses the data.

8. Either the CPU 80 or the DMA controller 90 transfers data from the CD co-processor 62 in the peripheral adapter 60 over the I/O channel 20 to the host application data buffer section 74.

9. Either the CPU 80 or the DMA controller 90 then transfers the data from the host application data buffer section 74 to the disk adapter RAM 44 of the disk adapter 40 over the I/O channel 20.

10. Finally, the disk adapter 40 transfers the data (corresponding to selected peripheral device 50a) from the disk adapter RAM 44 to the disk drive 30 for storage on the disk.

While the above sequence represents the preferred order of processing, it is to be expressly understood that variations thereof could be made thereto under the teachings of the present invention.

3. Transition From One Peripheral Device To A Second Peripheral Device

This example assumes that only one peripheral device 50 is initially present in the system of FIG. 3.

1. With reference to FIG. 3, a second peripheral adapter 60a may be installed, for example, in a separate slot of the I/O channel 20.

2. The first application program and the first ECC program corresponding to peripheral device number 1 are unloaded from the host RAM 70.

3. The second application program and the second ECC program, from the application program file number two in the hard disk 30, are loaded through the disk adapter I/O channel 20 to the host RAM 70. The second ECC program is placed in ECC program RAM 72 and the second application program is placed in the application program RAM 78.

4. The compression and decompression flow described above can then take place with respect to the second peripheral device 50a.

The present invention is not limited to one or two peripheral devices. Any number of peripheral devices could be installed as permitted by the system.

While the above sequence represents the preferred order of processing, it is to be expressly understood that variations thereof could be made thereto under the teachings of the present invention.

4. Concurrent Processing

The concurrent nature of the compression/decompression, peripheral transfer, disk transfer, and ECC activities of the present invention will now be discussed. With respect to FIG. 3 and the above discussion of data flows, it is apparent that transfers to and from the peripheral interfaces 68 can be made either under CPU 80 or DMA 90 control. In addition, transfers to or from the CD co-processor 62 can also be made under DMA 90 or CPU 80 control. Finally, transfers to and from the disk adapter 40 are made under DMA 90 or CPU 80 control. The ECC operations are performed, under the teachings of the present invention, only under CPU 80 control.

Any one, two, or three of the above four processes may run in a multi-tasking manner with the other processes resulting in a speed-up of performance of the computer system. The multi-tasking is accomplished under the teachings of the present invention in two patterns of operation.

The first pattern is to run a "background DMA." This is a method in which the DMA controller 90 is programmed for a given number of transfers with peripheral adapter 60. This allows the CPU 80 to be used for other tasks while the adapter transfers occur under control of the DMA 90 in the background. When the peripheral adapter 60 has made the given number of transfers or for other reasons requires CPU 80 attention, the peripheral adapter 60 issues an interrupt. The interrupt results in the CPU's attention being diverted from one process to another.

For purposes of this discussion, a task is defined as the series of executed CPU instructions that comprise a compute program or subprogram, the series of DMA transfers which occur in order to accomplish the transfer of data which may be required, and the hardware interrupt operation which effects switching of CPU execution among different tasks.

Currency or asynchronous operation, of tasks in background DMA is achieved through two means. One, CPU execution is switched among tasks via hardware interrupt operation. Servicing an interrupt request results in suspension of CPU execution of one task and the resumption of execution of another task, regardless of the location of execution of the CPU within the program of that task. Another hardware interrupt may result in a new task-switch, or a return from interrupt may result in the same.

Two, DMA data transfers of a task may occur independently of CPU execution, in an asynchronous or "background" manner. Once the CPU execution portion of a task has programmed both the peripheral adapter and the host DMA controller, DMA transfers may occur without further CPU involvement. To accomplish a DMA transfer, the DMA controller gains control of the I/O channel bus from the CPU, performs he data transfer, and relinquishes control of the I/O channel bus back to the CPU. CPU execution is halted briefly during the DMA transfer, or is entirely uninterrupted if use of the I/O channel bus was not required by the CPU during the DMA transfer.

TABLE I

| | BACKGROUND DMA TASK DESCRIPTION | | |
|---|---|---|---|
| TASK | CPU EXECUTION | DMA EXECUTION | TASK-SWITCHING INTERRUPT EXECUTION |
| DISK | Command/Status I/O Cycles General Program Execution Cycles Programmed I/O Data Transfer Cycles | | |
| PERIPHERAL | Peripheral Attention Cycles (Interrupt Routine) Peripheral DMA Complete Cycles (Interrupt Routine) | Peripheral DMA Channel Request/ Acknowledge Cycles | Peripheral Interrupt Requests |

In Table 1, above, two tasks are illustrated: disk and peripheral. The disk task CPU execution is described for clarity and no DMA or task-switching hardware interrupt operation is assumed. The peripheral CPU execution is described, and DMA and interrupt operation are assumed.

The concurrency of the tasks in Table 1 is illustrated in Table II.

TABLE II
BACKGROUND DMA SAMPLE I/O CHANNEL CYCLE DESCRIPTION

| BUS CYCLE | OWNERSHIP | TASK | EXPLANATION |
|---|---|---|---|
| n | CPU | Disk | |
| n + 1 | CPU | Disk | |
| n + 2 | CPU | Disk | |
| . | CPU | Disk | |
| . | . | . | |
| . | . | . | |
| . | CPU | Disk | |
| . | DMA | Peripheral | |
| . | CPU | Disk | |
| . | CPU | Disk | |
| . | . | . | |
| . | . | . | |
| . | CPU | Disk | |
| . | DMA | Peripheral | |
| . | CPU | Disk | |
| . | CPU | Peripheral | Result of Peripheral Interrupt |
| . | CPU | Peripheral | |
| . | . | . | |
| . | . | . | |
| . | CPU | Peripheral | |
| . | DMA | Peripheral | |
| . | CPU | Peripheral | |
| . | CPU | Peripheral | |
| n + i | CPU | Disk | Result of Returning From Interrupt |

Table II illustrates a snapshot of I/O channel bus cycle activity. For a series of consecutive bus cycles (n, n+1, n+2, ... ) I/O channel ownership, task under execution, and an explanation of CPU task-switch execution are presented.

The DMA portion of the peripheral task is identified by "DMA" in the ownership column. The CPU portion of each task is identified by "CPU" in the ownership column and the task identifier in the task column. CPU task switching is accomplished through the peripheral hardware interrupt.

The second approach to multitasking is a CPU 80 "time slicing" technique. For processes which cannot run a DMA 90 control, the CPU 80 time must be divided between the given processes with the aid of some other hardware interrupt. For example, the host system timer interrupt and an accompanying task-switching service routine can be used to transfer CPU attention among tasks as illustrated in Tables III and IV. These two approaches may be combined to achieve concurrency among tasks which are suited for background DMA and other tasks which are suited for time-slicing. For instance, in the present invention there are four tasks. The CD task and peripheral transfer task are suited for background DMA. The disk transfer task and ECC task are suited for time-slicing. Such concurrency results in an overall speed-up in the performance of the computer system.

TABLE III
TIME SLICING TASK DESCRIPTION

| TASK | CPU EXECUTION | DMA EXECUTION | TASK-SWITCHING INTERRUPT EXECUTION |
|---|---|---|---|
| DISK | Command/Status I/O Cycles General Program Execution Cycles Programmed I/O Data Transfer Cycles | | |
| ECC | General Program Execution Cycles | | |
| TASK SWITCHER | Timer Service Cycles (Interrupt Routine) | | Host Timer Interrupt Request Channel |

Table III illustrates three tasks which may run concurrently in a time-slicing manner. The tasks are the disk, ECC, and a task-switcher. The disk and ECC tasks are conventional tasks of a typical application program, whereas the task-switcher is a task whose sole purpose is to provide the mechanism for concurrency of the other two. Since neither the disk or ECC tasks have DMA or task-switching hardware interrupts at their disposal, the host timer interrupt is utilized in the task-switcher task to effect concurrency through the aforementioned means of hardware interrupt operation. The second means of DMA data transfer is not used in time-slicing concurrency.

TABLE IV
TIME SLICING SAMPLE I/O CHANNEL CYCLE DESCRIPTION

| I/O CYCLE | OWNERSHIP | TASK | EXPLANATION |
|---|---|---|---|
| n | CPU | Disk | |
| n + 1 | CPU | Disk | |
| n + 2 | CPU | Disk | |
| n + 3 | CPU | Disk | |
| . | . | . | |
| . | . | . | |
| . | CPU | Disk | |
| . | CPU | Timer Service | Results of Timer |
| . | CPU | Timer Service | Interrupt |
| . | CPU | Timer Service | |
| . | . | . | |
| . | CPU | Timer Service | |
| . | CPU | ECC | Result of Timer TASK |
| . | CPU | ECC | SWITCH |
| . | . | . | |
| . | CPU | ECC | |
| . | CPU | Timer Service | Result of Timer |
| . | CPU | Timer Service | Interrupt |
| . | . | . | Result of Timer TASK SWITCH |
| n + k | CPU | Disk | |

Table IV illustrates a sample of I/O channel bus cycle activity during time-slicing concurrency. Note that I/O channel ownership is always by CPU. There is no DMA portion of either task. The CPU portion of each task is identified in the task column. CPU task-switching is accomplished via the host timer interrupt and the task-switcher code.

In the above these two patterns of concurrent operation may be individually used or combined together in an overall concurrent arrangement.

It is to be expressly understood that the claimed invention is not to be limited to the description of the preferred embodiment but encompasses other modifications and alterations within the scope and spirit of the inventive concept.

We claim:

1. A computer system for providing error correction coding and compression/decompression of data, said computer system having a host computer, an input/output channel and one or a plurality of peripheral devices, said host computer and each of said plurality of peripheral devices connected to said input/output channel, said computer system further comprising:
   a compression/decompression circuit located in one of said peripheral devices for compressing and decompressing data,
   means for storing one or a plurality of application programs, each one of said application programs for use with one of said peripheral devices, each of said application programs containing an error correction coding program module,
   means in said host computer for receiving an application program from said storing means containing an error correction coding program module for one of said plurality of peripheral devices selected by said host computer, said host computer performing error correction on compressed data received over said input/output channel from said compression/decompression circuit based upon said received application program, said host computer further delivering the error corrected compressed data over said input/output channel to said selected peripheral device.

2. A computer system for providing error correction coding and compression/decompression of data, said computer system having a host computer, an input/output channel, a disk, and one or a plurality of peripheral devices, said host computer and said peripheral devices connected to said input/output channel, said computer system further comprising:
   a compression/decompression circuit located in one of said peripheral devices for compressing and decompressing data,
   one or a plurality of application programs located in said disk, each one of said application programs for use with one of said peripheral devices, each of said application programs containing an error correction coding program module, said error correction coding program module containing an error correction coding algorithm,
   means in said host computer for receiving an application program from said disk, said received application program containing an error correction coding program module for one of said peripheral devices selected by said host computer, said host computer performing error correction on compressed data received over said input/output channel from said compression/decompression circuit according to said error correction coding program module in said received application program, said host computer further delivering the error corrected compressed data over said input/output channel to said selected peripheral device.

3. A computer system for providing error correction coding and compression/decompression of data, said computer system having a host computer, an input/output channel, a disk, and one or a plurality of peripheral devices, said host computer and said peripheral devices connected to said input/output channel, said host computer having a RAM, a CPU, and a DMA controller, said computer system further comprising:
   a compression/decompression circuit located in one of said peripheral devices for compressing and decompressing data,
   one or a plurality of application programs located in said disk, each one of said application programs for use with one of said peripheral devices, each of said application programs containing an error correction coding program module, said error correction coding program module containing an error correction coding algorithm,
   said RAM in said host computer receiving an application program from said disk containing an error correction coding program module for one of said peripheral devices selected by said CPU, said host computer performing error correction coding on compressed data received over said input/output channel from said compression/decompression circuit according to said error correction coding program module in said received application program, said host computer further delivering the error corrected compressed data over said input/output channel to said selected peripheral device, said CPU and said DMA concurrently operating said disk, said compression/depression circuit, said RAM, and said selected peripheral device in a predetermined pattern of operation so as to speed up performance of said computer system.

4. The architecture of claim 3 wherein said pattern of operation is a background DMA task operation.

5. The architecture of claim 3 wherein said pattern of operation is a CPU time slice task operation.

6. The architecture of claim 3 wherein said pattern of operation is a combination of background DMA task and CPU time slice operation.

7. A method for providing error correction coding to compressed data in a computer system, the computer system having a host computer, an input/output channel, a disk and a plurality of peripheral devices; the host computer, the disk, and one or a plurality of peripheral devices connected to the input/output channel, the host computer having a RAM and a CPU, each of the peripheral devices having a peripheral adapter, said method comprising the steps of:
   providing an application program file in the disk for each of the peripheral devices, each application program file containing an error correction coding program module,
   selecting one peripheral device, under control of the CPU, from said plurality of peripheral devices,
   delivering from the disk over the input/output channel and into the RAM in the host computer the application program file containing an error correction coding program module for the selected peripheral device, providing a compression/decompression circuit in the peripheral adapter of one of the plurality of peripheral device, compressing data for the selected peripheral device in the compression/decompression circuit, delivering the compressed data to the host computer over the input/output channel, performing error correction on the compressed data in the host computer, delivering the error corrected data from the host computer over the input/output channel to the peripheral adapter of the selected peripheral device.

* * * * *